April 14, 1925.
C. E. SARGENT
GOVERNOR FOR WINDMILLS
Filed June 16, 1921
1,533,467
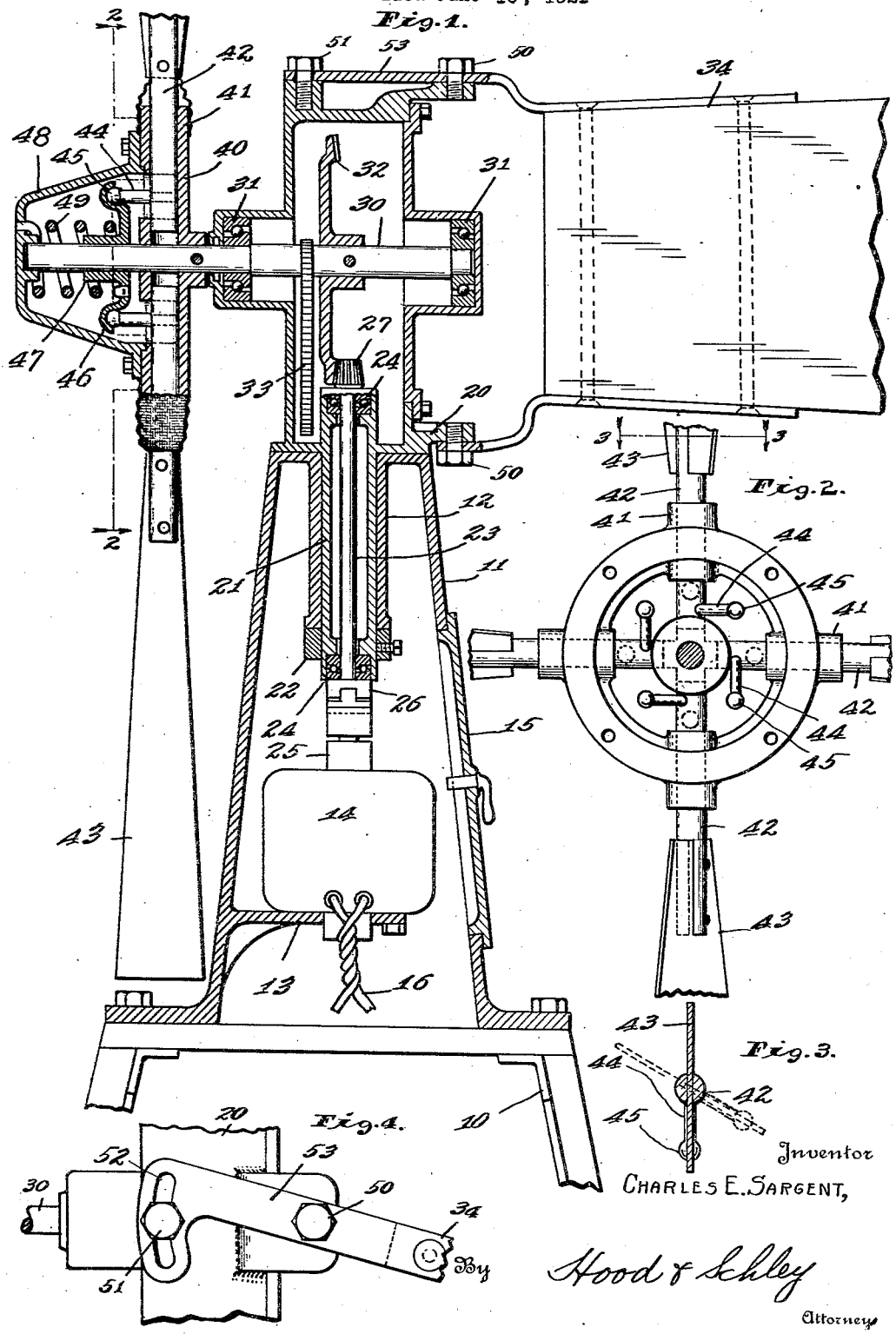
Inventor
CHARLES E. SARGENT,
By Hood & Schley
Attorneys Patented Apr. 14, 1925.

1,533,467

UNITED STATES PATENT OFFICE.

CHARLES E. SARGENT, OF INDIANAPOLIS, INDIANA.

GOVERNOR FOR WINDMILLS.

Application filed June 16, 1921. Serial No. 477,913.

*To all whom it may concern:*

Be it known that I, CHARLES E. SARGENT, a citizen of the United States, residing at Indianapolis, in the county of Marion and State of Indiana, have invented a new and useful Governor for Windmills, of which the following is a specification.

It is the object of my invention to provide a wind-driven electric generator, which will not interfere with the shifting of the wind wheel as the wind changes but which itself does not shift, and which will be operated at a substantially constant speed to maintain a substantially constant voltage.

The accompanying drawing illustrates my invention: Fig. 1 is a central vertical section through the upper part of a wind-mill equipped with a generator and wind-wheel of my invention; Fig. 2 is a section on the line 2—2 of Fig. 1; Fig. 3 is a transverse section, on the line 3—3 of Fig. 2, through one of the blades of the wind-wheel to show how the angle of the blade changes; and Fig. 4 is a fragmentary plan showing the adjustable pivotal mounting of the rudder or sail.

The wind-mill tower 10, of any suitable type, has fixed upon its top a casing 11 which at the top is provided with a downwardly extending socket 12, and which on the inside is provided with a shelf 13 supporting a vertical-shaft electric generator 14 to which access may be obtained through a removable door 15 provided in the side of the casing 11. The generator 14 is in fixed position, and the supply wires 16 therefrom may be carried to any desired place, frequently from the bottom of the wind-mill tower.

A second casing 20 rests upon the top of the fixed casing 11 and has a central hollow downward projection 21 which has a bearing fit within the socket 12, so that the casing 20 may turn on the casing 21 about the common axis of the projection 21 and socket 12. A collar 22 clamped to the lower end of the downward projection 21 prevents the latter from moving upward in the socket 12. A vertical shaft 23 is mounted centrally within the hollow projection 21, preferably on ball bearings 24 at its two ends, and is connected to the shaft 25 of the generator 14 by a suitable coupling 26. The upper end of the shaft 23 carries a bevel pinion 27.

A shaft 30 is mounted in the rotatable casing 20, conveniently on ball bearings 31. This shaft 30, which is shown as a horizontal shaft though it is not necessarily horizontal, carries a bevel gear 32 within the casing 20, and this bevel gear 32 meshes with the pinion 27 for all positions which the rotatable casing 20 may take. Conveniently the lower part of the rotatable casing 20 is an oil reservoir, the socket 21 being continued upward beyond the bottom of such reservoir, and oil from this reservoir is supplied to the shaft 30 and its bearings by a suitable oiling device, such as a chain oiler 33. The shaft 30 projects at one end from the rotatable casing 20, to carry the wind-wheel, and the casing 30 is provided with a tail or rudder 34 which projects from such casing on the opposite side thereof from the projecting end of the shaft 30 to hold the face of the wind-wheel against the wind in the usual manner of wind-mills.

Fixed on the projecting end of the shaft 30 outside of the casing 20 is a hub 40 which has a plurality of radial bearing bosses 41 to receive the inner ends of radial shafts 42 which project outward from such hub and are provided with blades or sails 43 which are acted upon by the wind to rotate the shaft 30. These radial shafts 42 are rotatable through a limited arc in the socket 41, to change the angle of the blades or sails 43 to the plane of rotation of the wind wheel, and they are also axially slidable in said socket to a limited extent. Near its inner end each radial shaft 42 is provided with a transversely projecting pin 44, conveniently in the plane of the corresponding blade or sail 43; each pin is provided at its outer end with a ball-head 45 which fits in a correspondingly shaped cup 46, which is one of several such cups, one for each radial shaft 42, in a flange of a sleeve 47 which is slidably and rotatably mounted on the shaft 30 near the outer face of the hub 40. A cap 48 encloses the projecting end of the shaft 30 beyond the hub 40, and is bolted to such hub to rotate therewith; this cap is removed in Fig. 2. A combined torsion and compression spring surrounds the shaft 30 between the sleeve 47 and the outer end of the cap 48, and the ends of such springs are received in suitable eccentrically located holes in such cap and sleeves, as is clear from Fig. 1. The spring 49 tends both to push the sleeve 47 toward the hub 40, and to rotate such sleeve on the shaft 30 in a clockwise direction (Fig. 2) relatively to said hub; so that the interaction of the cups 46 and balls 45 tends to turn the radial shafts 42, (in a counter-clockwise direction, Fig. 3,) to decrease the angle between the blades or sails 43 and the plane of rotation of the wind-wheel, and to throw the radial shafts 42 inward.

In operation: When the wind blows, the action thereof on the tail or rudder 34 holds the wind-wheel always facing the wind, and the rotatable casing 20 shifts as the wind shifts to maintain the wind-wheel always in this position with relation to the wind. As the casing 20 thus shifts, it does so without interfering with the driving connection from the shaft 30 to the shaft 23 through the bevel gearing 32—27, so that such drive is always maintained for any position of the casing 20 without requiring any shifting of the position of the generator 14, and so that the electrical connections from the latter may be simple connections as from a stationary generator. The action of the wind on the blades or sails 43 rotates the shaft 30, and thereby drives the shaft 23 and the generator 14 to produce the desired electric current.

As the wind increases in velocity, it tends to make the wind-wheel rotate more rapidly. Such more rapid rotation causes the radial shafts 42 to move outward by centrifugal force. The radial shafts 42 can only move outward, however, by causing a corresponding outward movement of the pins 44 and the heads 45; and by reason of the engagement of the heads 45 with the cups 46, such heads 45 are constrained to move in an arc of a circle about the axis of the shaft 30, (always, of course, relatively to the hub 40,) and as this occurs the sleeve 47 is both turned and pushed away from the hub 40 against its combined pressure and torsion resistance, and the radial shafts 42 are constrained to turn on their own axes as they move outward, thus increasing the angle of the sails or blades 43 to the plane of rotation of the wind wheel, as is clear from Fig. 3. Thus as the speed increases a governing effect is produced on the blades or sails 43, changing their angle to cause a tendency to cut down the speed of rotation. This limits the amount by which the speed of rotation may increase, and keeps such speed below a definite maximum. When the speed of the wind falls, and the speed of rotation correspondingly falls, the effect of centrifugal force on the radial shafts 42 is diminished, and such shafts are drawn inward and turned on their axes by the combined pressure and torsion action of the spring 49, thus diminishing the angle of the blades or sails 43 to the plane of rotation of the wind-wheel.

Because of the reaction of the generator through the gearing 27—32 on the shaft 30 there is created a tendency to rotate the rotatable casing 20 and the parts carried thereby, in a clockwise direction as viewed from above with the parts as shown. To prevent this, the tail or rudder is mounted at an oblique angle, viewed from above, to the shaft 30 so that the action of the wind thereon opposes the aforesaid tendency to turn. To balance this action against this turning tendency, the tail or rudder is preferably mounted on pivot bolts 50 on the rotatable casing 20, and a clamping bolt 51 extends through an arc-shaped slot 52 in a forwardly extending arm 53 from such tail to permit angular adjustment of the tail and clamping thereof in adjusted position.

I claim as my invention:

1. In a wind-wheel governor, the combination of a wind-wheel shaft, a hub mounted thereon and having radial sockets, radial shafts mounted in said sockets, blades carried by said radial shafts, and spring means acting upon said radial shafts tending to rotate them in one direction on their axes and move them inward against the effect of centrifugal force upon them.

2. In a wind-wheel governor, the combination of a wind-wheel shaft, a hub mounted thereon and having radial sockets, radial shafts mounted in said sockets, blades carried by said radial shafts, lateral pins projecting from said radial shafts, a sleeve mounted on said first-named shaft and having eccentrically located sockets receiving the heads of said pins, and a torsion spring acting upon said sleeve.

3. In a wind-wheel governor, the combination of a wind-wheel shaft, a hub mounted thereon and having radial sockets, radial shafts mounted in said sockets, blades carried by said radial shafts, lateral pins projecting from said radial shafts, a sleeve mounted on said first-named shaft and having eccentrically located sockets receiving the heads of said pins, and a compression spring acting upon said sleeve.

4. In a wind-wheel governor, the combination of a wind-wheel shaft, a hub mounted thereon and having radial sockets, radial shafts mounted in said sockets, blades carried by said radial shafts, lateral pins projecting from said radial shafts, a sleeve mounted on said first-named shaft and having eccentrically located sockets receiving the heads of said pins, and a combined torsion and compression spring acting upon said sleeve.

5. In a wind-wheel, a plurality of blades rotatable to vary their respective angles of incidence, and means actuated by the centrifugal force of said blades to decrease their angles of incidence as the speed of rotation of the wind-wheel increases and to increase their angles of incidence as the speed of rotation decreases.

In witness whereof, I have hereunto set my hand at Indianapolis, Indiana, this 31 day of May, A. D. one thousand nine hundred and twenty one.

CHARLES E. SARGENT.